US011788538B2

(12) United States Patent
Yamaoka et al.

(10) Patent No.: US 11,788,538 B2
(45) Date of Patent: Oct. 17, 2023

(54) BLOWER HAVING MULTIPLE CONTROL SWITCHES

(71) Applicant: Nanjing Chervon Industry Co., Ltd., Nanjing (CN)

(72) Inventors: Toshinari Yamaoka, Nanjing (CN); Jingwei Li, Nanjing (CN); Fangjie Nie, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 631 days.

(21) Appl. No.: 16/824,094

(22) Filed: Mar. 19, 2020

(65) Prior Publication Data

US 2020/0214229 A1    Jul. 9, 2020

Related U.S. Application Data

(63) Continuation of application No. PCT/CN2018/095423, filed on Jul. 12, 2018.

(30) Foreign Application Priority Data

Sep. 30, 2017  (CN) .......................... 201710913870.1
Sep. 30, 2017  (CN) .......................... 201721289191.3

(Continued)

(51) Int. Cl.
*F04D 27/00* (2006.01)
*A01G 20/47* (2018.01)
(Continued)

(52) U.S. Cl.
CPC ............. *F04D 27/00* (2013.01); *A01G 20/47* (2018.02); *B08B 5/02* (2013.01); *F04D 25/06* (2013.01);
(Continued)

(58) Field of Classification Search
CPC ....... F04D 27/003; F04D 27/007; E01H 1/05; E01H 1/108
See application file for complete search history.

(56) References Cited

U.S. PATENT DOCUMENTS 6,834,413 B2 * 12/2004 Sanders ..................... A47L 5/14
                                                                      15/405
8,984,710 B2 *  3/2015 Yokoyama ............. A01G 20/47
                                                                      15/327.5
(Continued)

FOREIGN PATENT DOCUMENTS

CN      206279481 U    6/2017
CN      106930214 A    7/2017
(Continued)

OTHER PUBLICATIONS

ISA/CN, International Search Report issued on application No. PCT/CN2018/095423, dated Sep. 27, 2018, 2 pages.

*Primary Examiner* — Nathan C Zollinger
*Assistant Examiner* — Timothy P Solak
(74) *Attorney, Agent, or Firm* — Greenberg Traurig, LLP

(57) ABSTRACT

A blower includes an air tube, an electric motor, a fan, a housing, and a circuit board. The air tube is provided with an air duct extending along a first straight line. The electric motor is arranged in the air duct. The fan is operative to be driven by the electric motor. The housing is provided with a handle configured to be held by a user and a joining portion configured for connecting to a power source. And the circuit board is electrically connected to the electric motor. The air tube is provided with an air inlet at one end of the air duct and an air outlet at another end of the air duct. The fan is arranged in the air duct, and when the fan rotates, a blowing airflow entering the air duct from the air inlet is generated.

20 Claims, 10 Drawing Sheets

(30) Foreign Application Priority Data

Sep. 30, 2017 (CN) .......................... 201721289227.8
Sep. 30, 2017 (CN) .......................... 201721289972.2

(51) Int. Cl.
*B08B 5/02* (2006.01)
*F04D 25/06* (2006.01)
*F04D 29/40* (2006.01)
*F04D 29/58* (2006.01)
*F04D 19/00* (2006.01)
*F04D 29/52* (2006.01)

(52) U.S. Cl.
CPC ......... *F04D 27/004* (2013.01); *F04D 27/007* (2013.01); *F04D 29/403* (2013.01); *F04D 29/584* (2013.01); *F04D 19/002* (2013.01); *F04D 25/0673* (2013.01); *F04D 25/0693* (2013.01); *F04D 29/522* (2013.01)

(56) References Cited

U.S. PATENT DOCUMENTS

| | | | | |
|---|---|---|---|---|
| 2006/0219218 | A1* | 10/2006 | Yuasa | F02D 11/02 123/198 DB |
| 2014/0140861 | A1* | 5/2014 | Pellenc | F04D 25/0673 417/63 |
| 2014/0234130 | A1* | 8/2014 | Yamaoka | F04D 25/0673 417/234 |
| 2016/0108924 | A1* | 4/2016 | Conrad | F04D 25/0673 417/423.7 |

FOREIGN PATENT DOCUMENTS

| | | |
|---|---|---|
| CN | 207512674 U | 6/2018 |
| CN | 207512675 U | 6/2018 |
| CN | 207512676 U | 6/2018 |
| WO | 2014119175 A1 | 8/2014 |

\* cited by examiner

BLOWER HAVING MULTIPLE CONTROL SWITCHES

RELATED APPLICATION INFORMATION

This application is a continuation of International Application Number PCT/CN2018/095423, filed on Jul. 12, 2018, through which this application also claims the benefit under 35 U.S.C. § 119(a) of Chinese Patent Application No. CN 201710913870.1, filed on Sep. 30, 2017, Chinese Patent Application No. CN 201721289972.2, filed on Sep. 30, 2017, Chinese Patent Application No. CN 201721289191.3, filed on Sep. 30, 2017, and Chinese Patent Application No. CN 201721289227.8, filed on Sep. 30, 2017, each of which is incorporated by reference in its entirety herein.

TECHNICAL FIELD

The present disclosure relates generally to blowers, and more particularly relates to a switch of the blower.

BACKGROUND

The blower serves as a garden tool for the user to operate to blow grass debris, leaves, etc. so as to clean the courtyard or garden.

The blower generally includes a main switch for starting the motor, other function switches, a housing, a circuit board, and a blow nozzle.

The main switch sometimes is also integrated with a function of speed adjustment. Because the main switch is arranged on a handle and is disposed on a lower side of the handle, it is difficult for a user to observe the displacement of the main switch. Therefore, it is difficult for the user to make the motor operate at an ideal speed, making it difficult to guarantee the air blowing effect and efficiency of the blower.

The main switch or other function switches are generally arranged in an accommodation cavity formed by the housing. When the blower is operating, a heat dissipation airflow flowing through the accommodation cavity is generated, and the heat dissipation airflow is used to dissipate heat of the circuit board in the accommodation cavity. Apparently, the heat dissipation airflow easily causes dust to be blown to the main switch or other function switches. In the long run, the main switch or other function switches will fail due to excessive dust accumulation.

The blow nozzle is used to guide a blowing airflow. The existing blow nozzle however has a poor stability, and a flow velocity of the blowing airflow is greatly reduced when the blowing airflow passes through the blow nozzle, affecting the air blowing effect. In addition, when passing through the blow nozzle the blowing airflow generates a relatively loud noise.

In addition, for the whole blower, weight thereof usually reaches a few kilograms, which makes the user feel very tired after long-time use, affecting the work efficiency of the user.

SUMMARY

In one example, a blower includes an air tube, an electric motor, a fan, a housing, and a circuit board. The air tube is provided with an air duct extending along a first straight line, the electric motor is arranged in the air duct; the fan may be driven by the electric motor, the housing is provided with a handle configured to be held by a user and a joining portion configured for connecting to a power source, and the circuit board is electrically connected to the electric motor. The air tube is provided with an air inlet at an end of the air duct and an air outlet at another end of the air duct, the fan is arranged in the air duct, and when the fan rotates, a blowing airflow entering the air duct from the air inlet may be generated.

In a further example, the blower includes a first switch assembled to the housing. The first switch includes a first operating unit and a first switch element, the first operating unit at least partially protrudes out of the housing to be operated by the user, and the first switch element is configured to control the electric motor when the first operating unit is operated by the user. The housing is also provided with an airflow inlet and an airflow outlet. When the fan rotates, a heat dissipation airflow that may flow into the housing from the airflow inlet and flow out of the housing from the airflow outlet may be generated in the housing. And the first switch element is disposed outside of a flow path of the heat dissipation airflow in the housing.

In a further example, a separating board is provided in the housing, and the flow path of the heat dissipation airflow in the housing is disposed on one side of the separating board, and the first switch element is disposed on another side of the separating board.

In a further example, the circuit board is electrically connected to the electric motor and to the first switch element, and the heat dissipation airflow is operative to flow through the circuit board.

In a further example, the blower further includes a heat dissipation element connected to the circuit board, and the heat dissipation airflow is operative to flow through the heat dissipation element.

In a further example, a separating board is provided in the housing and configured to separate the circuit board from the first switch element.

In a further example, the heat dissipation element is disposed on a side of the separating board where the circuit board is arranged.

In a further example, the housing includes a left housing and a right housing that form an integrity when interconnected, the left housing is provided with a left separating board portion, and the right housing is provided with a right separating board portion. When the left housing and the right housing are interconnected, the left separating board portion and the right separating board portion are combined to form the separating board.

In a further example, the blower further includes a main switch for starting the electric motor. The main switch includes a main operating unit and a main switch element, the main operating unit is assembled to the handle, and the main switch element controls the electric motor to start when the main operating unit is operated by the user. The main operating unit includes an actuation portion for contacting the main switch element. The user's hand, when gripping the handle, is operative to simultaneously hold the main operating unit, and the actuation portion is disposed outside of the flow path of the heat dissipation airflow in the housing.

In a further example, the first switch is a speed adjusting switch configured for the user to adjust rotational speed of the electric motor, and the first operating unit is a rotary knob.

In a further example, the blower further includes a second switch, which includes a second operating unit configured to be operated by the user, and a second switch element that is operative to enable the electric motor to operate at a maximum rotational speed when the second operating unit is operated by the user. The second operating unit includes a second actuation portion for contacting the second switch element, the second actuation portion is disposed in the housing, and the second actuation portion and the second switch element are disposed outside of the flow path of the heat dissipation airflow in the housing.

In a further example, the blower further includes the main switch for starting the electric motor and a first speed adjusting switch for adjusting rotational speed of the electric motor. The main switch includes a main operating unit and a main switch element, the main operating unit is assembled to the handle and configured to be operated by the user, and the main switch element is connected to the circuit board to control the electric motor to start when the main operating unit is operated by the user. The first speed adjusting switch includes a first operating unit and a first switch element, the first operating unit is fitted to the housing and configured to be operated by the user, the first switch element is connected to the circuit board and configured to adjust the rotational speed of the electric motor when the first operating unit is operated by the user. And along the first straight line, the first speed adjusting switch is disposed between the joining portion and the air inlet.

In a further example, the housing includes the left housing and the right housing that form the integrity when interconnected, and the first operating unit is installed on one of the left housing and the right housing.

In a further example, the housing is arranged symmetrically about a symmetrical plane, and the first operating unit is disposed on a side of the symmetrical plane.

In a further example, the blower further includes a second speed adjusting switch, including the second operating unit configured to be operated by the user and the second switch element that is operative to enable the electric motor to operate at a maximum rotational speed when the second operating unit is operated by the user.

In a further example, the symmetrical plane passes through the second operating unit.

In a further example, a distance between two closest points on the first operating unit and the main operating unit is arranged less than or equal to 5 cm, so that the user's hand holding the main operating unit may simultaneously operate the first operating unit.

In a further example, the main operating unit and the housing form a rotatable connection with a second straight line as an axis, the first operating unit and the housing form a rotatable connection with a third straight line as an axis, where the third straight line and the second straight line are parallel to each other.

In a further example, the blower further includes a control circuit, configured to control the rotational speed of the electric motor in accordance with an angle of rotation of the main operating unit relative to the housing when the main operating unit is triggered by the user.

In a further example, the blower further includes a control circuit, configured to control the electric motor to start when the main operating unit is not triggered by the user and the first operating unit is triggered by the user.

In a further example, the first operating unit is a rotary knob that is rotatably connected to the housing.

In a further example, the blower further includes a control circuit, configured to control the electric motor to start after the main operating unit is not triggered by the user and the first operating unit is rotated by the user at a certain angle, and control the electric motor to continue to operate when the user stops operating the first operating unit to keep the first operating unit at the certain angle.

In a further example, the blower further includes a blow nozzle, which is detachably fitted to an end of the air tube where the air outlet is provided. The blow nozzle is provided with a blow channel that is in communication with the air duct, and the blow nozzle includes an fitting portion, a blow portion, and a connection portion. The fitting portion is configured for fitting the blow nozzle to the air tube, and the blow portion has a blow port. An end of the connection portion is connected to the fitting portion, another end of the connection portion is smoothly connected to the blow portion, and the flow velocity of the blowing airflow increases when the blowing airflow passes through the connection portion.

In a further example, the connection portion is a solid of revolution with the first straight line as a rotation center.

In a further example, an inner wall of the blow channel formed by the blow nozzle is a solid of revolution with the first straight line as a rotation center.

In a further example, a connection channel is provided that surrounds the connection portion, and is a part of the blow channel; and the connection channel is gradually reduced from the fitting portion toward the blow portion.

In a further example, an inner wall of the connection portion is formed with a connection channel around the first straight line, and the connection channel is a part of the blow channel; and the connection channel is symmetrical about a symmetrical plane parallel to a first axis.

In a further example, a cross-section of the connection channel in the symmetrical plane is a two-section symmetrical curve, one end of the curve is connected to the fitting portion and another end of the curve is connected to the blow portion; and an included angle between a tangent line at each point of the curve and the first straight line first increases and then decreases in a direction from an end of the curve connected to the connection portion to an end of the curve connected to the blow portion.

In a further example, at least a part of an inner wall of the blow portion forms a cylindrical channel around the first straight line, and the fitting portion is sleeved on an outer wall of the air tube.

In a further example, the fitting portion is sleeved on an outer wall of the air tube, an inner wall of the fitting portion is provided with an inner guide portion, the outer wall of the air tube is provided with an outer guide portion, and the inner guide portion and the outer guide portion cooperate with each other to guide the fitting portion to be coupled to the air tube along the first straight line.

In a further example, the fitting portion is sleeved on the outer wall of the air tube, the inner wall of the fitting portion is provided with a groove extending in a direction parallel to the first straight line, and the outer wall of the air tube is provided with a protrusion operative to be embedded into the groove.

In a further example, a ratio of a length of the air tube along the first straight line to a length of the fitting portion along the first straight line is arranged greater than or equal to 7 and less than or equal to 11.

In a further example, a ratio of a maximum circumference of the fitting portion around the first straight line to a length of the fitting portion along the first straight line is arranged greater than or equal to 3 and less than or equal to 4.5.

In a further example, the blower further includes a hook including an fitting portion for fitting the hook to the housing and a hook body integrally formed with the fitting portion, the hook body is bent along a curve to form an opening, and a distance between the hook and a center of gravity of the blower is arranged greater than or equal to 50 mm and less than or equal to 80 mm.

In a further example, the hook is fitted to the joining portion.

In a further example, along the first straight line, the hook is disposed on a side of the air inlet adjacent to the joining portion.

In a further example, the blower further includes an air inlet hood fitted at the air inlet of the air tube, and along the first straight line, the hook is disposed on a side of the air inlet hood adjacent to a battery pack.

In a further example, the opening is open toward the battery pack.

In a further example, the hook body extends in a plane, and the plane and the first straight line form an included angle greater than or equal to 10 degrees and less than or equal to 50 degrees.

In a further example, the housing is symmetrically disposed about a symmetrical plane. The fitting portion includes a fitting surface that is adhered to the outer wall of the housing, the fitting surface extends in a plane parallel to the symmetrical plane, the hook body is integrally formed with the fitting portion, and the hook body extends in a plane that obliquely intersects with the symmetrical plane.

In a further example, the housing is provided with an insertion slot, and the fitting surface is provided with an insertion portion operative to be embedded into the insertion slot, the fitting portion is further formed with a through hole, and the hook further includes a fastener connected to the housing through the through hole.

In a further example, the hook body includes: a first section and a second section, the first section extends in a direction perpendicular to the first straight line, and the second section extends from the first section, where the direction in which the second section extends obliquely intersects the direction in which the first section extends.

In a further example, the housing is arranged symmetrically about a symmetrical plane, and there are two of the hooks, one of the two hooks is arranged on one side of the symmetrical plane, and another one is arranged on another side of the symmetrical plane.

In a further example, a blower includes an air tube, provided with an air duct extending along a first straight line; an electric motor, arranged in the air duct; a fan, configured to be driven by the electric motor; a housing, provided with a handle configured to be held by a user and a joining portion configured for connecting to a power source; a circuit board, electrically connected to the electric motor; a main switch, comprising a main operation unit for the user to operate and a main switch element electrically connected to the circuit board, wherein the main switch element controls the electric motor to start when the main operation unit is operated by the user; a first speed adjusting switch, comprising a first operation unit for the user to operate and a first switch element electrically connected to the circuit board, wherein the first switch element controls the motor to run at different speeds when the first operation unit is operated by the user; and a second speed adjusting switch, comprising a second operation unit for the user to operate and a second switch element electrically connected to the circuit board, wherein the second switch element controls the motor to run at a maximum rotational speed when the second operation unit is operated by the user. The main operation unit is disposed on the lower side of the handle, the first operation unit is disposed on the left side of the handle, and the second operation unit is disposed on the upper side of the handle.

In a further example, a blower includes an air tube, provided with an air duct extending along a first straight line; an electric motor, arranged in the air duct; a fan, configured to be driven by the electric motor; a housing, provided with a handle configured to be held by a user and a joining portion configured for connecting to a power source; a circuit board, electrically connected to the electric motor; a main switch, comprising a main operation unit for the user to operate and a main switch element electrically connected to the circuit board, wherein the main switch element controls the electric motor to start when the main operation unit is operated by the user; and a first speed adjusting switch, comprising a first operation unit for the user to operate and a first switch element electrically connected to the circuit board, wherein the first switch element controls the motor to run at different speeds when the first operation unit is operated by the user. The main operation unit is disposed on the lower side of the handle, and the first operation unit is disposed on the left side of the handle The present disclosure is advantageous in that the blower has a reasonable structure and a high air blowing efficiency.

DETAILED DESCRIPTION

Figure 1:
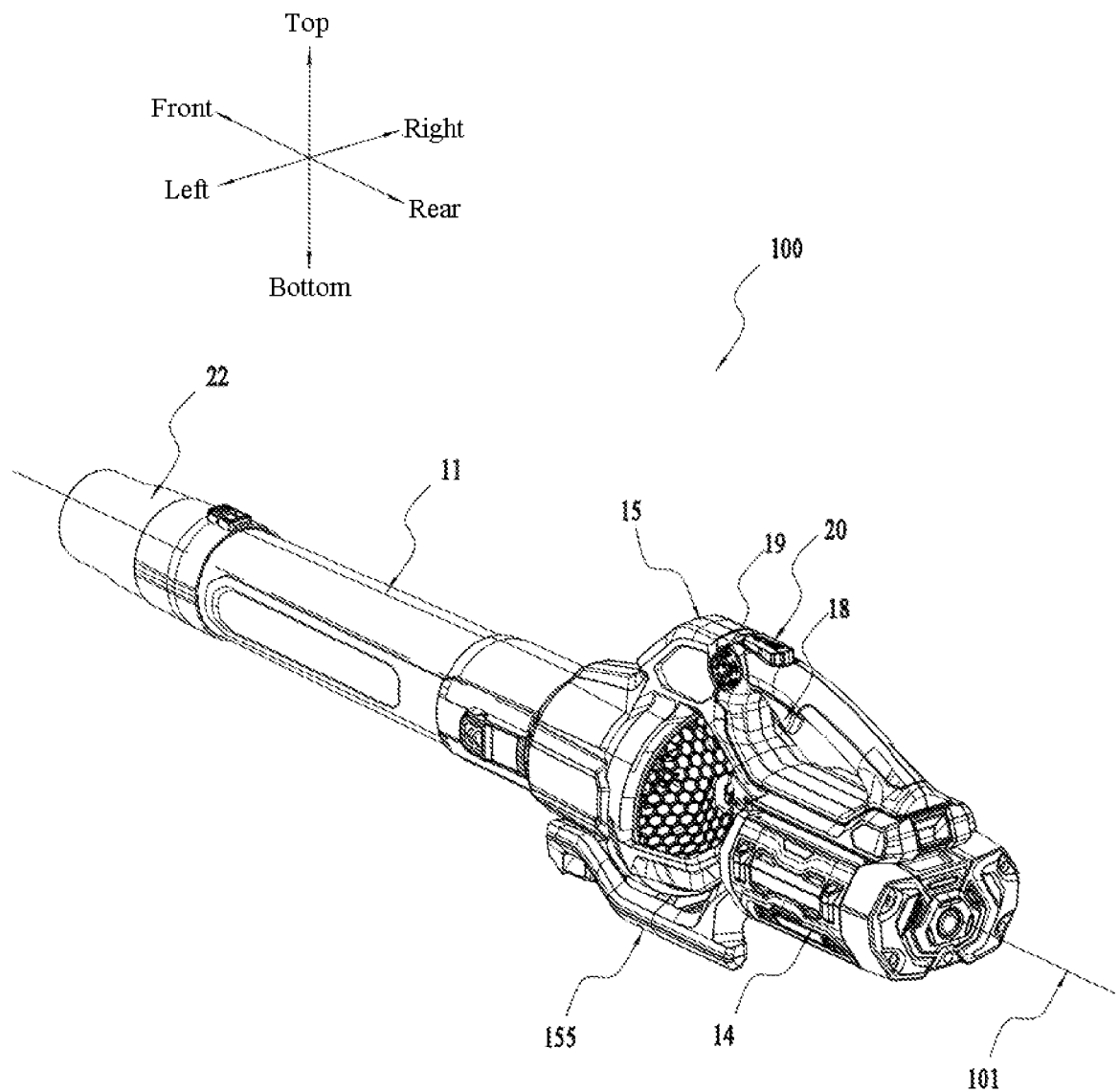
FIG. 1 is a perspective view of an example blower in accordance with the present disclosure.

The blower 100 shown in FIGS. 1 to 5 includes an air tube 11, a motor 12, a fan 13, a battery pack 14, and a housing 15. The air tube 11 is provided with an air duct 111 extending along a first straight line 101, and the air tube 11 is provided with an air inlet and an air outlet at both ends of the air duct 111. The motor 12 and the fan 13 are both disposed in the air duct 111, the motor 12 is used to drive the fan 13 to rotate about the first straight line 101 as an axis. When the fan 13 rotates, a blowing airflow entering the air duct 111 from the air inlet may be generated. The motor 12 may specifically be an electric motor, and the battery pack 14 is used to supply power to the motor 12. The housing 15 is connected to the air tube 11 and the battery pack 14, the housing 15 is further provided with a handle 151 for the user to hold, the handle 151 is arranged on the same side as the air tube 11 and the battery pack 14, an air intake space 152 is formed by enclosing the housing 15 for allowing airflow to enter the air duct 111, and the air intake space 152 is open along a plurality of radial directions around a circumference of the first straight line 101. The air tube 11, the air intake space 152, and the battery pack 14 are generally arranged along a first straight line 101. The air intake space 152 is also disposed between the air tube 11 and the battery pack 14, and the handle 151 is also at least partially disposed between the air tube 11 and the battery pack 14. By such arrangement, a center of gravity of the blower 100 and the handle 151 may be as close as possible along the first straight line 101, so that the user may operate the blower 100 more steadily.

In order to facilitate the description of the technical solution of the present disclosure, directions indicated by arrows in FIG. 1 are respectively defined as: upper side, lower side, left side, right side, front side, and rear side.

The air tube 11 is substantially a cylinder surrounding the first straight line 101, and both ends of the air tube 11 along the first straight line 101 are open to form an air inlet and an air outlet. The motor 12 and the fan 13 are disposed at a portion of the air duct 111 facing toward the air inlet, and the fan 13 is disposed at a rear side of the motor 12. An air inlet hood 16 is also fitted at a position of the air tube 11 where the air inlet is provided, and the air inlet hood 16 enables the blowing airflow to enter the air duct 111 uniformly, and may also prevent large particles of debris from entering the air duct 111.

The housing 15 further includes a joining portion 153, a connection structure 154, and a base 155. The joining portion 153 is used for detachably connected to the battery pack 14 to the housing 15 in a direction parallel to the first straight line 101. It is understood that in other examples, the joining portion 153 may also be used to combine alternating current wires that is able to be connected to a city power grid. The connection structure 154 is used to connect the air tube 11 and the battery pack 14, and surrounds the above-mentioned air intake space 152. The base 155 is arranged on a lower side of the air tube 11 and the battery pack 14 to support the whole blower 100.

The housing 15 is further substantially symmetrical about a symmetrical plane 102 parallel to the first straight line 101. Specifically, the housing 15 includes a left housing 156 and a right housing 157 that are symmetrical about a symmetrical plane 102. The left housing 156 and the right housing 157 may be two separate parts, both of which may be fixedly connected by screws. When interconnected, the left housing 156 and the right housing 157 form the housing 15, and the left housing 156 and the right housing 157 also surround an accommodation cavity 158 when interconnected.

In order to control the blower 100, the blower 100 further includes a circuit board 17, a main switch 18, a first switch, and a second switch. The circuit board 17 is disposed in an accommodation cavity 158 formed by the housing 15. In this example, the first switch is specifically a first speed adjusting switch 19, the second switch is a second speed adjusting switch 20, where the main switch 18, the first speed adjusting switch 19, and the second speed adjusting switch 20 are electrically connected to the circuit board 17, thereby controlling the motor 12.

The main switch 18 is disposed on the handle 151 of the housing 15, and is specifically a trigger for the user to operate to start the motor 12. As illustrated in FIGS. 6 to 9, the main switch 18 includes a main operating unit 181 and a main switch element 182. The main operating unit 181 is fitted to the handle 151, when the user holds the handle 151, the user's hand may simultaneously hold the main operating unit 181, and when the main operating unit 181 is operated by the user, the main switch element 182 may control the motor 12 to start. More specifically, the user's palm may be in contact with the handle 151, and the bent fingers of the user are in contact with the main operating unit 181, so that the user may hold the handle 151 and the main operating unit 181 with one hand at the same time. Furthermore, the user may start the motor 12 conveniently and quickly when holding the handle 151, and may also release the main switch 18 when the user's hand releases the handle 151. The main operating unit 181 and the housing 15 form a rotatable connection with a second straight line 103 as an axis, and the second straight line 103 is perpendicular to the first straight line 101, and is also perpendicular to the symmetrical plane 102. The main operating unit 181 includes an operation portion 181a and an actuation portion 181b. The operation portion 181a protrudes out of the housing 15 for the user to operate, and the actuation portion 181b is disposed in the handle 151, that is, in the accommodation cavity 158. The actuation portion 181b is also in contact with the main switch element 182, and the main switch element 182 is connected to the circuit board 17. When the user contacts the operation portion 181a and causes the first operating unit 191 to rotate relative to the housing 15 about the first straight line 101 as an axis, a position of the actuation portion 181b is changed to trigger the main switch element 182, and the main switch element 182 controls the motor 12 to start.

The first speed adjusting switch 19 is fitted on the housing 15, and the first speed adjusting switch 19 is used for the user to adjust rotational speed of the motor 12. In the direction along the first straight line 101, the first speed adjusting switch 19 is also disposed between the battery pack 14 and the air inlet. By such arrangement, the first speed adjusting switch 19 may be disposed as close to the handle 151 as possible, so that when the user holds the handle 151, the hand of the user may contact the first speed adjusting switch 19, thereby facilitating the user to adjust the rotational speed of the motor 12.

The first speed adjusting switch 19 includes a first operating unit 191 and a first switch element 192. The first operating unit 191 is used for the user to operate, and the first switch element 192 is connected to the circuit board 17, so that the circuit board 17 is electrically connected to the motor 12 and the first switch element 192. When the first operating unit 191 is operated by the user, the first switch element 192 may control the motor 12 to run at different rotational speeds. The first operating unit 191 is disposed close to the handle 151, and a distance between the two closest points on the first operating unit 191 and the main operating unit 181 is less than or equal to 5 cm, further, a distance between the two closest points on the first operating unit 191 and the main operating unit 181 is less than or equal to 2 cm, so that when the user holds the handle 151 and the main operating unit 181, a thumb of the user holding the handle 151 may contact the first operating unit 191, thereby facilitating the user to adjust speed in real time. The first operating unit 191 and the housing 15 form a rotatable connection with a third straight line 104 as an axis, the third straight line 104 and the second straight line 103 are parallel to each other, and the third straight line 104 and the first straight line 101 are perpendicular to each other. The first operating unit 191 is a rotary knob rotatably connected to the housing 15, and the user adjusts the rotational speed of the motor 12 by rotating the rotary knob. The first operating unit 191 is also disposed on a side of the symmetrical plane 102 of the housing 15, and the first operating unit 191 may be specifically fitted on the left housing 156 or the right housing 157. In the present example, the first operating unit 191 is arranged on the left housing 156.

In fact, in the present example, the main switch 18 is a trigger for starting the blower 100. Therefore, after the user operates the main switch 18 to start the motor 12, the user may also adjust the rotational speed of the motor 12 by adjusting an angle of rotation of the main operating unit 181 relative to the housing 15. That is, the user may adjust the rotational speed of the motor 12 via the main switch 18 or the first speed adjusting switch 19. If the user may merely adjust the speed by operating the main switch 18, it is obvious that the user may not accurately adjust the rotational speed of the motor 12 to achieve required blowing effect. At this time, the user may only judge by relatively rough experience, which is easy to deviate from the expected effect. Instead, the blower 100 of the present application is further provided with a first speed adjusting switch 19, which is different from the main switch 18, and the first speed adjusting switch 19 is also disposed outside a holding area of the handle 151. By such arrangement, the user may easily observe a stroke generated by the first operating unit 181, so as to adjust the rotational speed of the motor to achieve desired blowing effect. In addition, the housing 15 may also be provided with some scales reflecting the displacement of the first operating unit 181. By such arrangement, the first speed adjusting switch 18 is provided on the blower 100 for the user to adjust the rotational speed of the motor 12, so that flow velocity of the blowing airflow of the blower 100 is reasonable, and the problem that fallen leaves are easily blown off due to an excessive flow velocity, and the problem of low efficiency caused by an excessively small flow velocity may be avoided, so that the blower 100 may achieve both the blowing effect and the blowing efficiency.

The blower 100 further includes a control circuit, configured to control the rotational speed of the motor 12 in accordance with an angle of rotation of the main operating unit 181 relative to the housing 15 when the main operating unit 181 is triggered by the user, the control circuit may also control the motor 12 to start when the main operating unit 181 is not triggered and the first operating unit 191 is triggered by the user. That is, when the main operating unit 181 is not triggered, the user may also start the motor 12 by operating the first operating unit 191 and may also adjust the rotational speed of the motor 12 by operating the first operating unit 191 after the motor 12 is started. In addition, when the user adjusts the rotational speed of the motor 12 by operating the first operating unit 191, at this moment, if the user does not trigger the main operating unit 181 and stops triggering the first operating unit 191 so that the first operating unit 191 remains at a position rotated by a certain angle, and a control device will control the motor 12 to rotate at a certain rotational speed, so as to achieve a purpose of cruise with constant speed. By such arrangement, the user may operate any one of the main operating unit 181 and the first operating unit 191 to start the motor 12, and may also adjust the rotational speed of the motor 12 by rotating any one of the main operating unit 181 and the first operating unit 191.

The second speed adjusting switch 20 includes a second operating unit 201 and a second switch element 202. The second operating unit 201 at least partially protrudes out of the housing 15, and the second switch element 202 is connected to the circuit board 17. By such arrangement, when the user operates the second operating unit 201, the second switch element 202 enables the motor 12 operate at the maximum rotational speed. The second operating unit 201 is a button 221a provided on the handle 151, and the second operating unit 201 and the main operating unit 181 are respectively provided on an upper side and a lower side of the handle 151. The second operating unit 201 further includes a second actuation portion 201a disposed in the accommodation cavity 158 of the housing 15, and the second actuation portion 201a is used to contact the second switch unit. The symmetrical plane 102 also passes through the second operating unit 201, that is, a part of the second operating unit 201 is arranged at the left housing 156 and another part of the second operating unit 201 is provided at the right housing 157.

Figure 2:
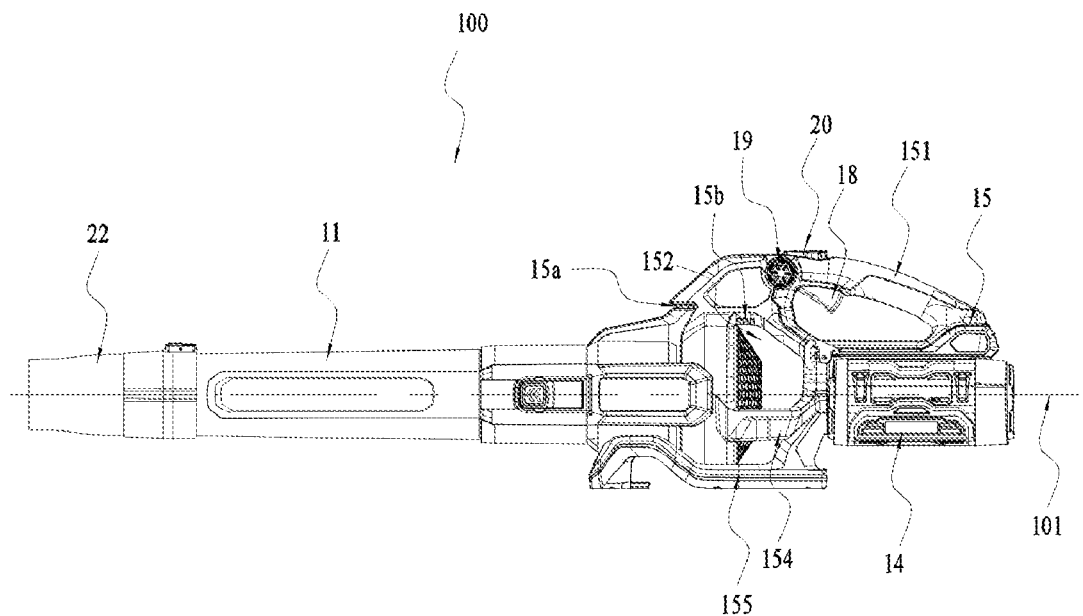
FIG. 2 is a plan view of the blower of FIG. 1.
Figure 3:
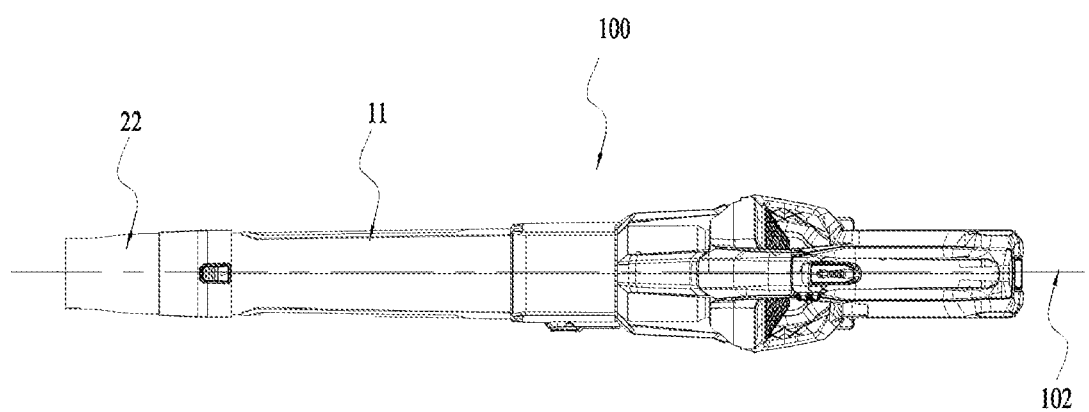
FIG. 3 is a top view of the blower of FIG. 1.

As illustrated in FIG. 2, the housing 15 is further formed with an airflow inlet 15a and an airflow outlet 15b. The airflow inlet 15a is in communication with the accommodation cavity 158 of the housing 15 and the outside, and the airflow outlet 15b is also in communication with the accommodation cavity 158 and the outside. When the fan 13 rotates, a heat dissipation airflow flowing into the housing 15 from the airflow inlet 15a and then flowing out of the housing 15 from the airflow outlet 15b may be generated in the housing 15, and the heat dissipation airflow may dissipate heat of the electronic elements in the housing 15. The airflow outlet 15b is also opened toward the air inlet space 152. By such arrangement, after the heat dissipation airflow flows out from the airflow outlet 15b, the heat dissipation airflow will at least partially flow into the air duct 111 through the air inlet under the negative pressure at the air inlet space 152.

As illustrated in FIGS. 4 to 9, the housing 15 is further provided with a separating board 159, both ends of which are connected to the inner wall of the housing 15, and the separating board 159 is configured to separate the accommodation cavity 158 of the housing 15. The airflow inlet 15a and the airflow outlet 15b are disposed on a same side of the separating board 159. The circuit board 17 is arranged on a side of the separating board 159 where the airflow inlet 15a is disposed. By such arrangement, the heat dissipation airflow may flow through the circuit board 17, thereby dissipating heat of the circuit board 17. The blower 100 further includes a heat dissipation element 21, which is connected to the circuit board 17, the heat dissipation element 21 and the circuit board 17 are disposed on the same side of the separating board 159, and the heat dissipation element 21 may be made of a metal material such as copper or aluminum. By such arrangement, the heat dissipation airflow also flows through the heat dissipation element 21, and the heat dissipation airflow transfers the heat transferring from the circuit board 17 to the heat dissipation element 21 out of the blower 100, thereby further improving the heat dissipation effect.

The first switch element 192 of the first speed adjusting switch 19 and the second switch element 202 of the second speed adjusting switch 20 are disposed on the same side of the separating board 159, and the first switch element 192 and the second switch element 202 are disposed on a side of the separating board 159 facing away from the circuit board 17, that is, the flow path of the heat dissipation airflow in the housing 15 and the first switch element 192 are respectively located on both sides of the separating board 159, and the flow path of the heat dissipation airflow in the housing 15 and the second switch element 202 are also located on the both sides of the separating board 159. By such arrangement, the first switch element 192 and the second switch element 202 are located outside the flow path of the heat dissipation airflow in the housing 15, so that dust caused by the heat dissipation airflow may be prevented from entering a side of the separating board 159 where the first switch element 192 and the second switching element 202 are provided, and the effectiveness of the first switch element 192 and the second switch element 202 being affected by dust is prevented. Further, the actuation portion 181b of the main switch 18 and the second actuation portion 201a of the second speed adjusting switch 20 are also disposed on a side of the separating board 159 facing away from the circuit board 17, and a portion of the main switch element 182 that is in contact with the actuation portion 181b is also disposed on the side of the separating board 159 facing away from the circuit board 17. By such arrangement, the actuation portion 181b and the second actuation portion 201a are located outside the flow path of the heat dissipation airflow in the housing 15, so that dust may be prevented from sticking to the actuation portion 181b and the second actuation portion 201a to cause failure of the actuation portion 181b and the second actuation portion 201a. Arrows in FIG. 4 roughly indicate a flowing direction of the heat dissipation airflow.

The left housing 156 is provided with a left separating board portion 159a, and the right housing 157 is provided with a right separating board portion 159b. When the left housing 156 and the right housing 157 are interconnected, the left separating board portion 159a and the right separating board portion 159b are combined to form separating board 159.

Figure 4:
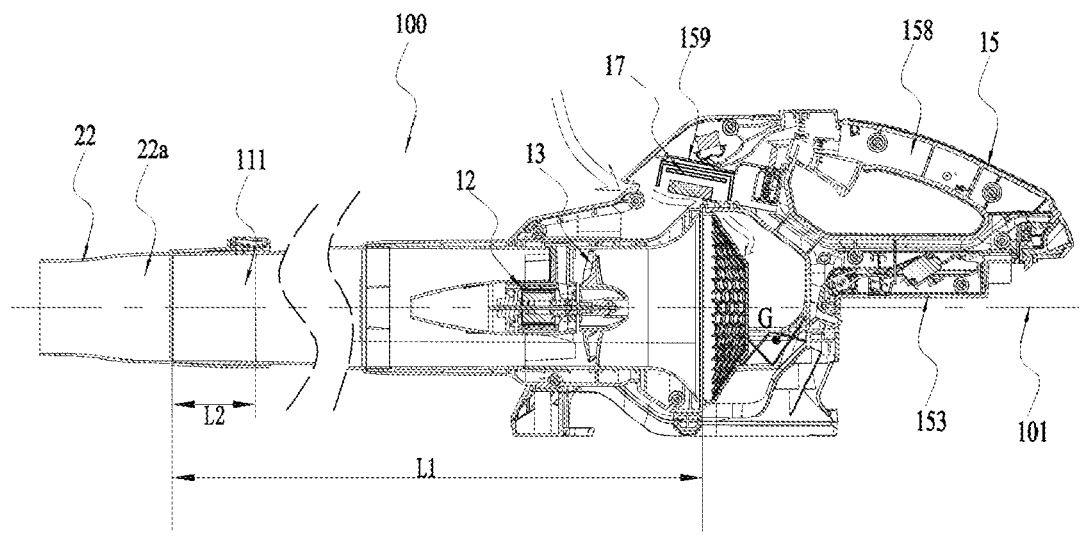
FIG. 4 is a sectional view of the blower of FIG. 1 after a battery pack is removed.
Figure 5:
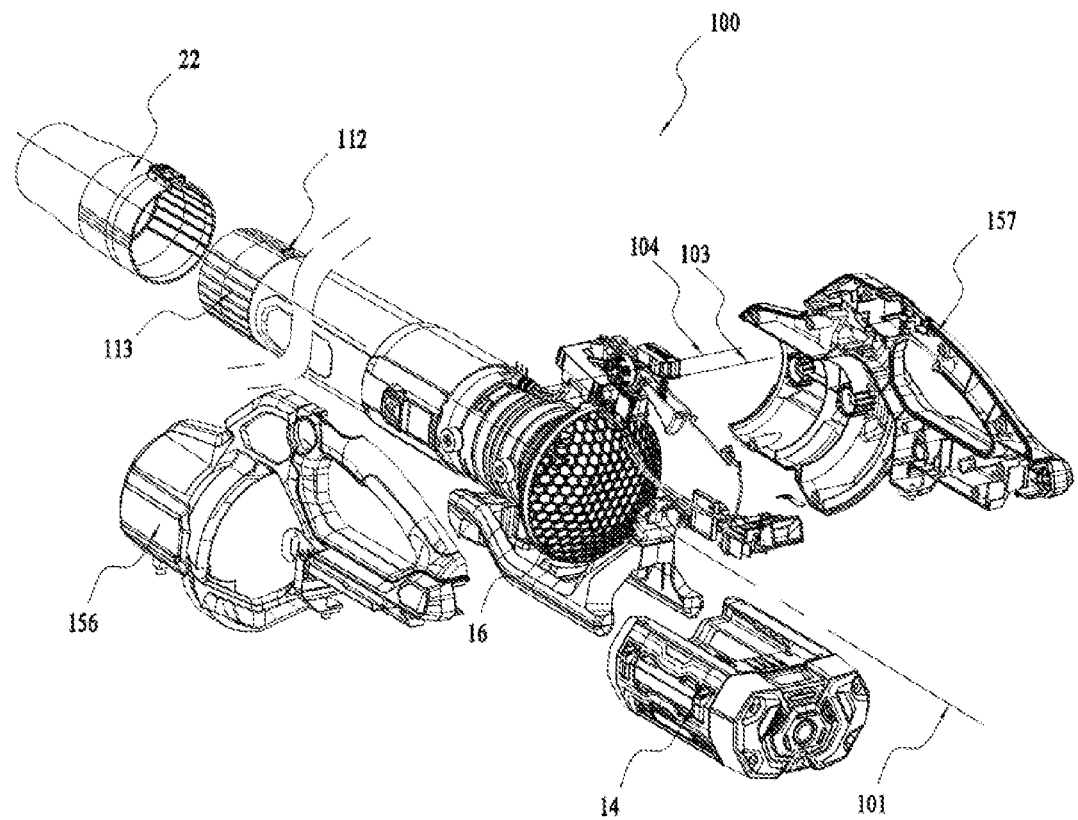
FIG. 5 is an exploded view of the blower of FIG. 1.
Figure 6:
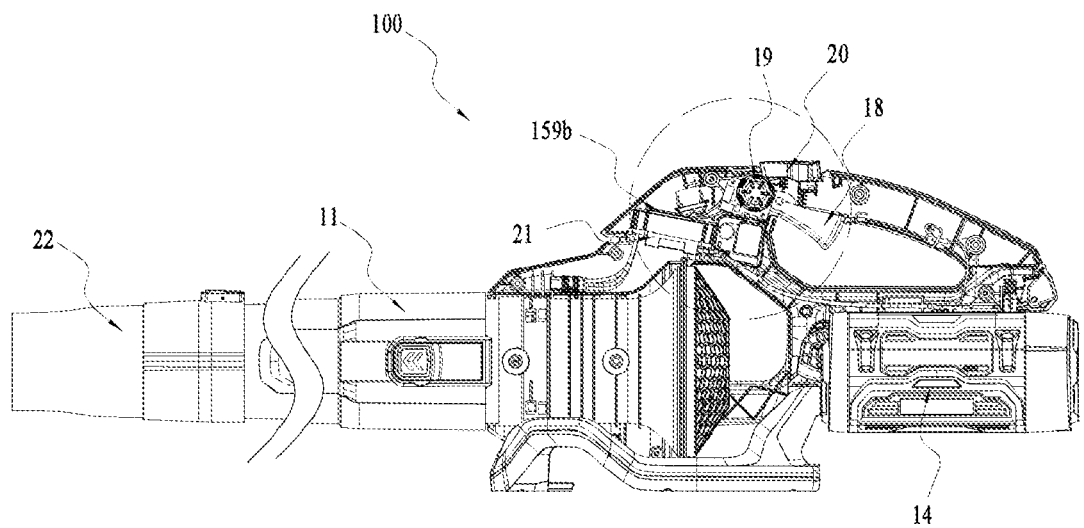
FIG. 6 is a plan view of the blower of FIG. 1 after a left housing is removed.
Figure 7:
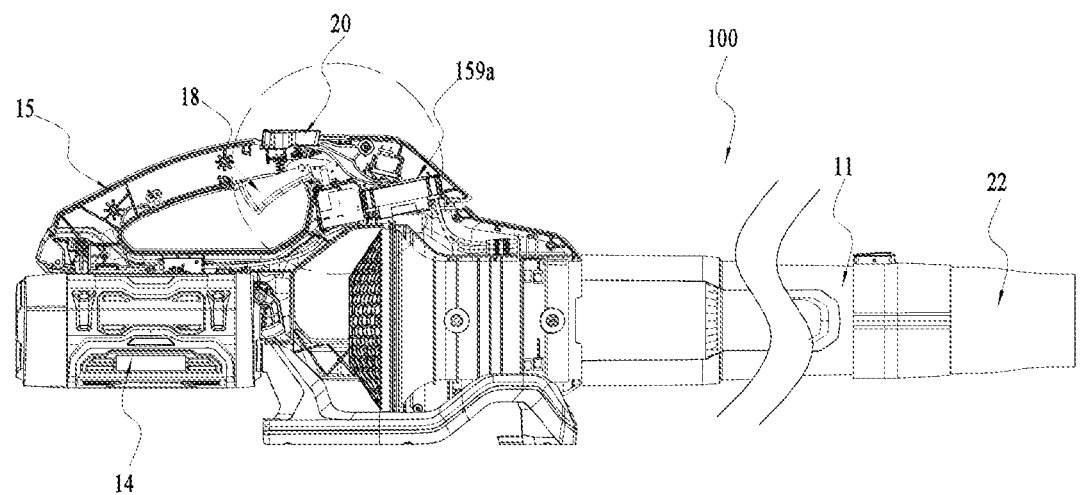
FIG. 7 is a plan view of the blower of FIG. 1 after a right housing is removed.
Figure 8:
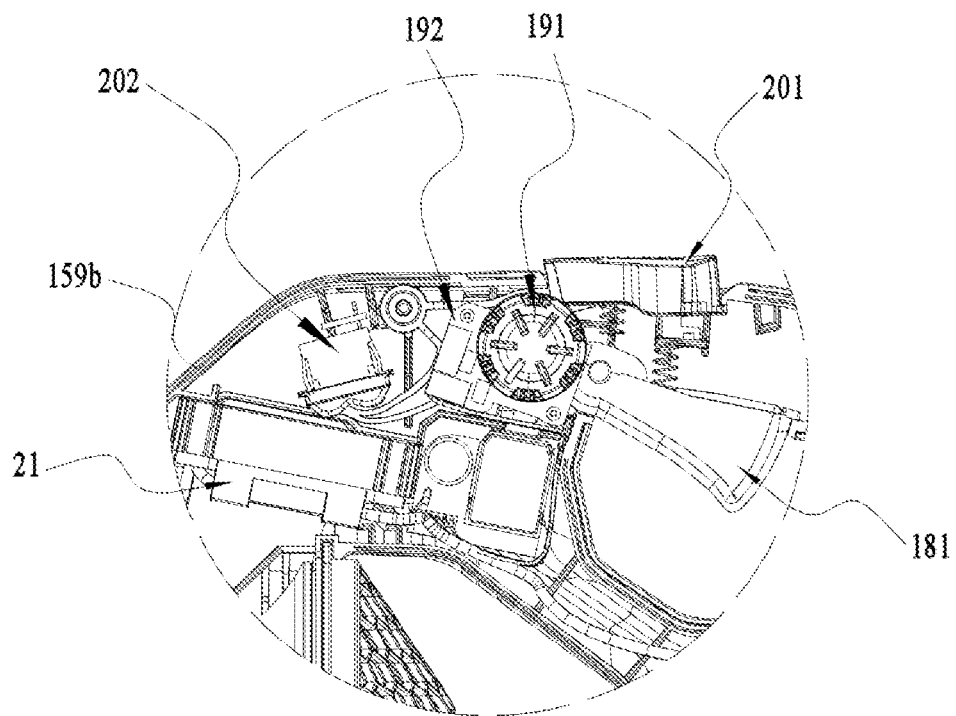
FIG. 8 is an enlarged view of a partial structure of FIG. 6.
Figure 9:
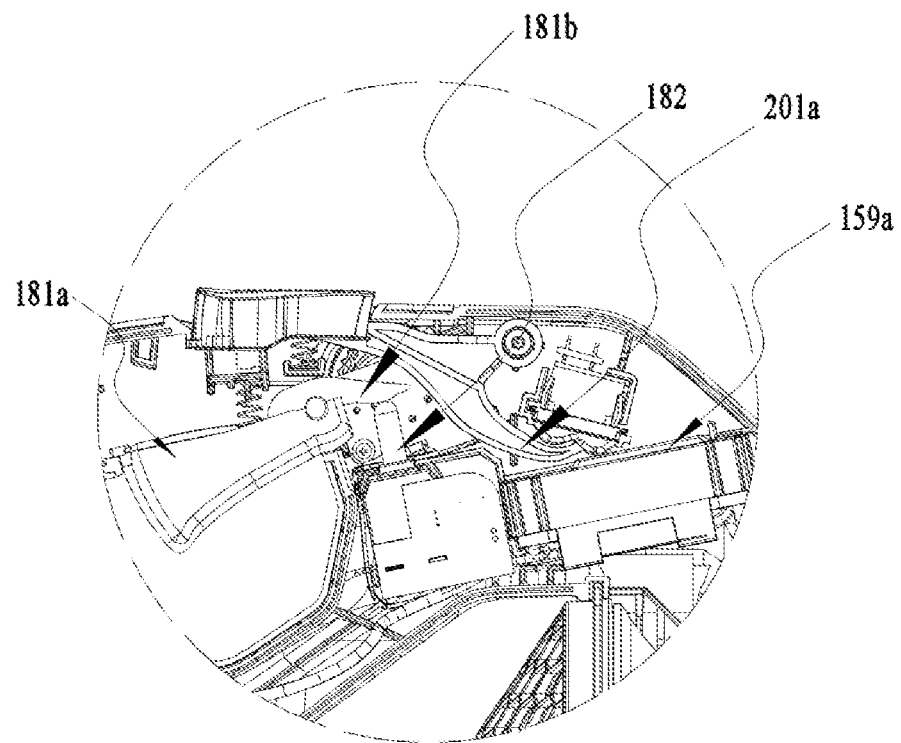
FIG. 9 is an enlarged view of a partial structure of FIG. 7.
Figure 10:
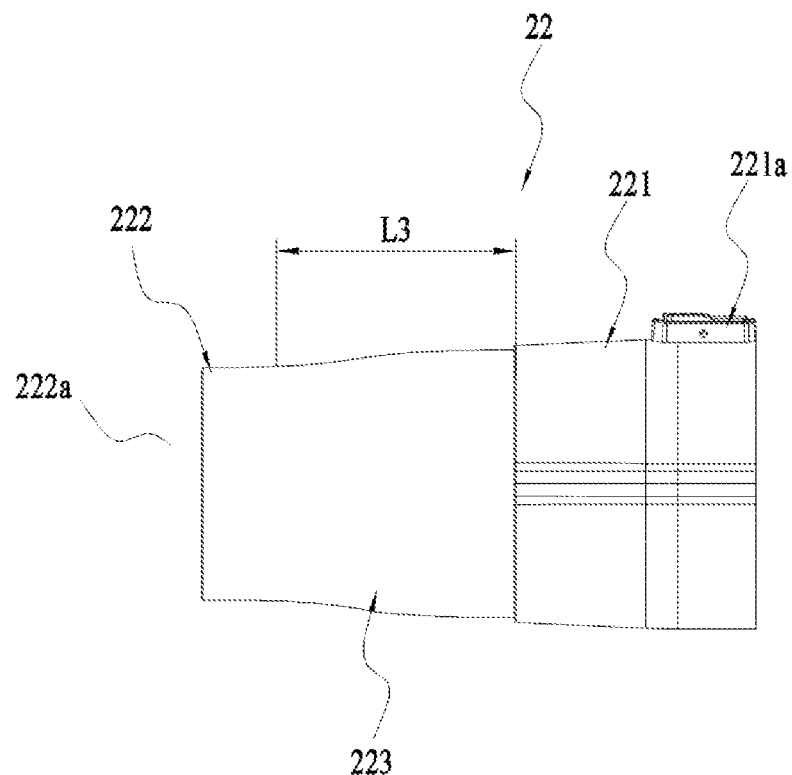
FIG. 10 is a plan view of a blow nozzle of FIG. 1.
Figure 11:
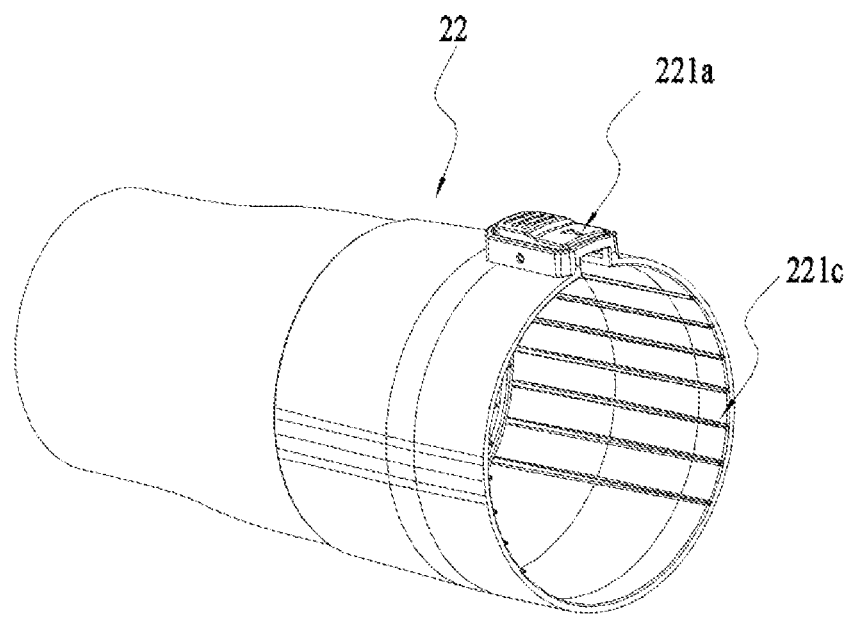
FIG. 11 is a perspective view of the blow nozzle of FIG. 10.
Figure 12:
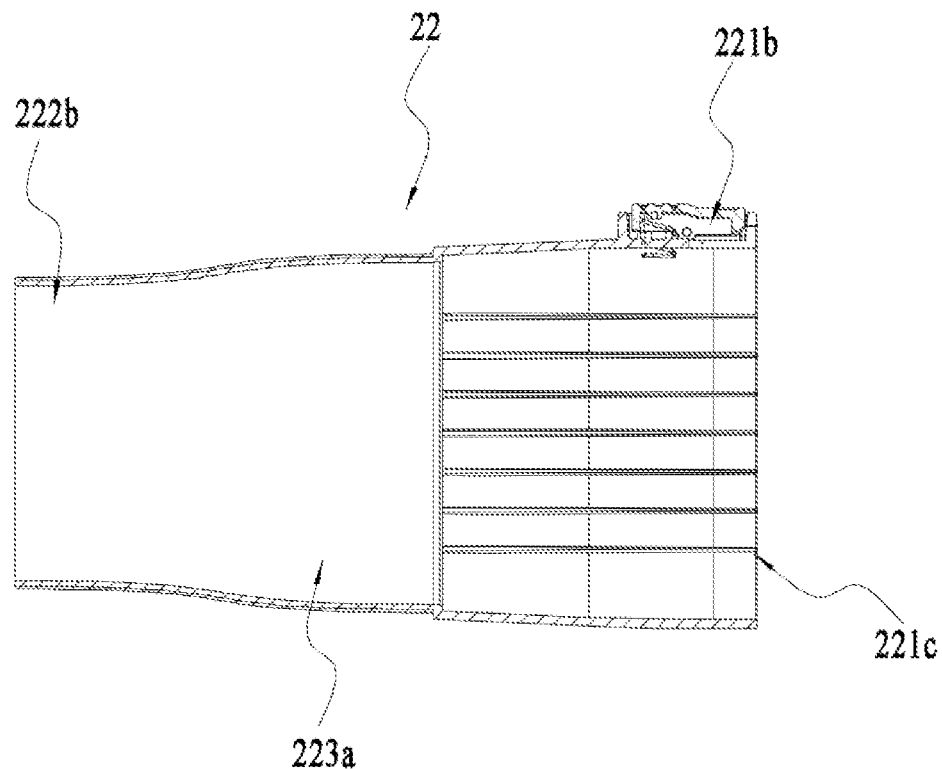
FIG. 12 is a sectional view of the blow nozzle of FIG. 10.
Figure 13:
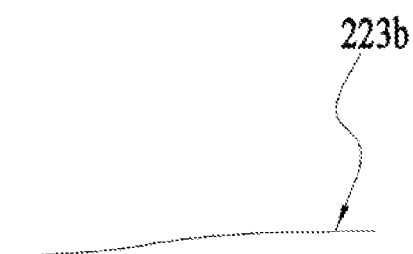
FIG. 13 is a cross-sectional view of an inner wall of the joining portion of FIG. 10.
Figure 14:
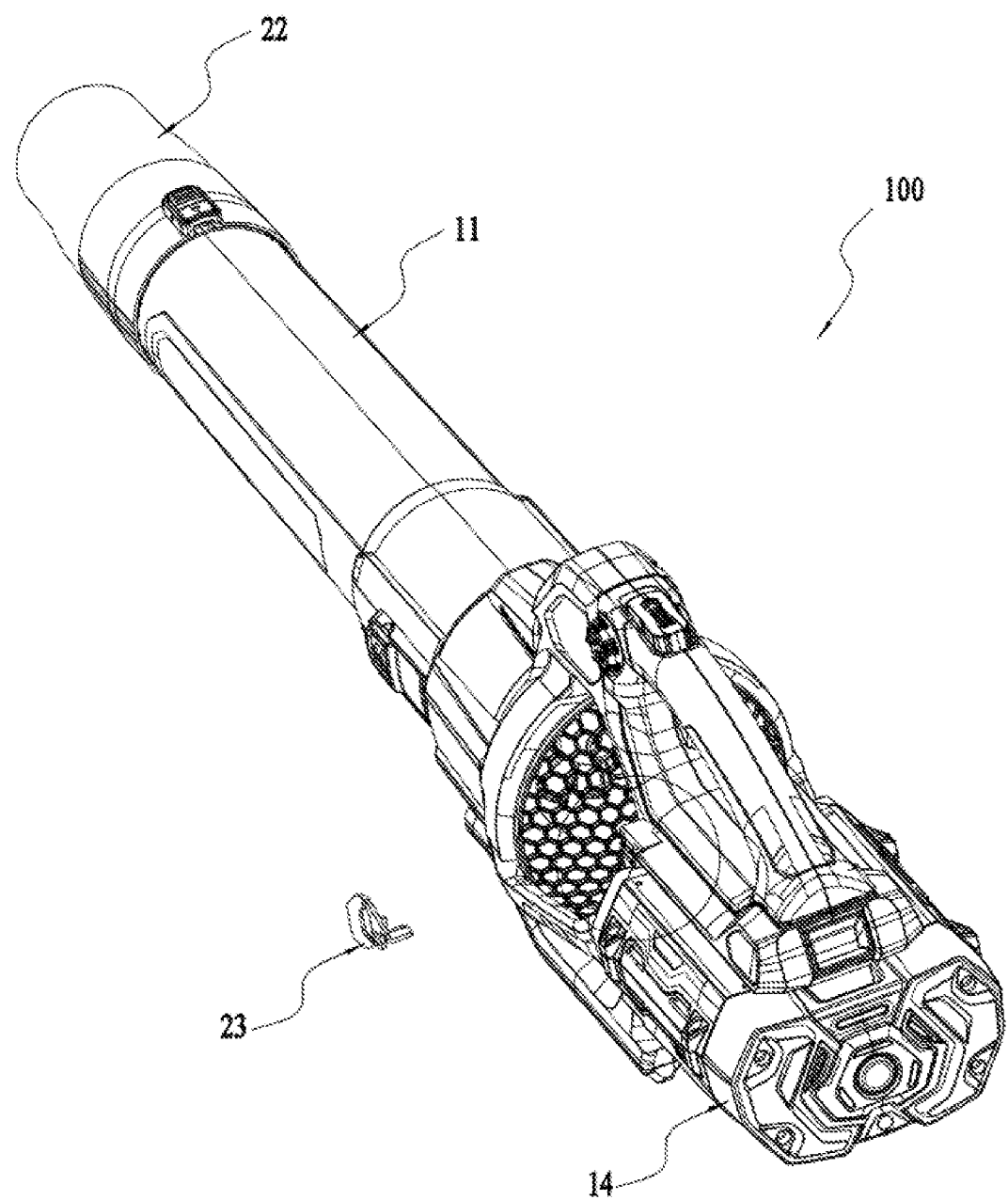
FIG. 14 is a perspective view of the blower of FIG. 1 when a hook is separated.
Figure 15:
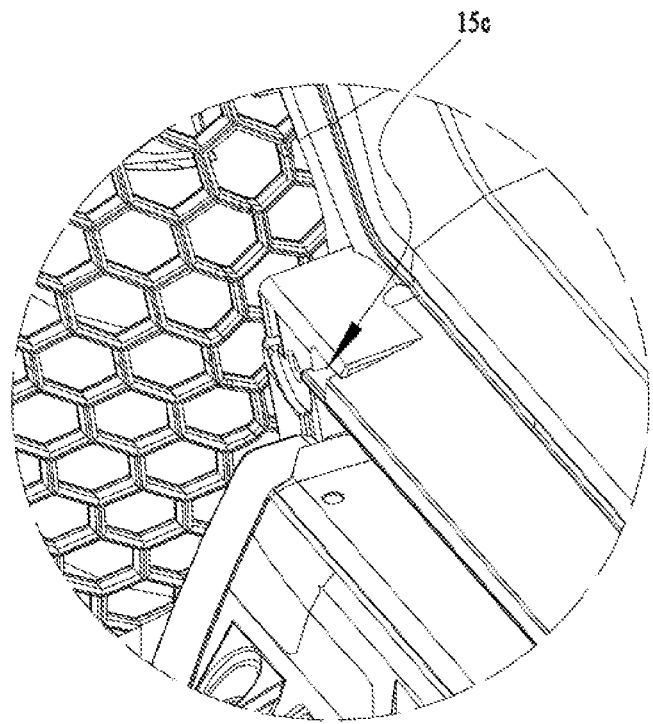
FIG. 15 is an enlarged diagram of a partial structure of FIG. 14.
Figure 16:
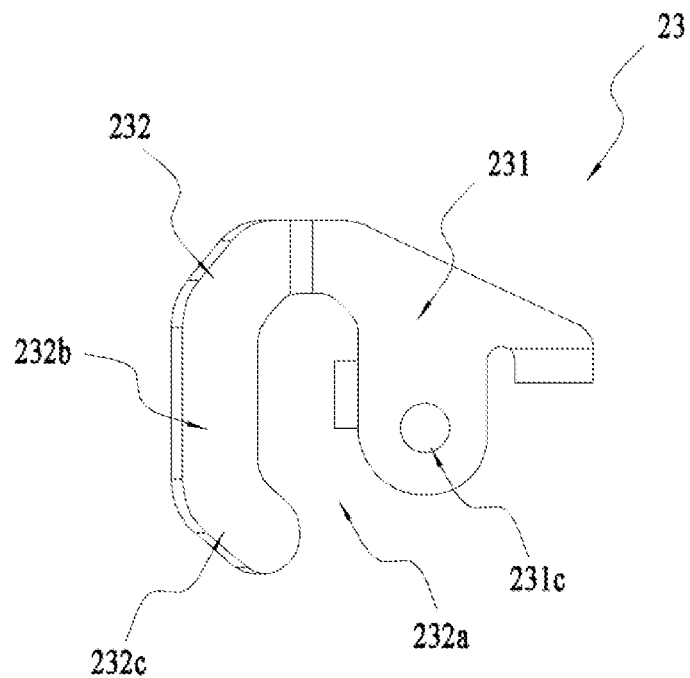
FIG. 16 is a plan view of the hook of FIG. 14.
Figure 17:
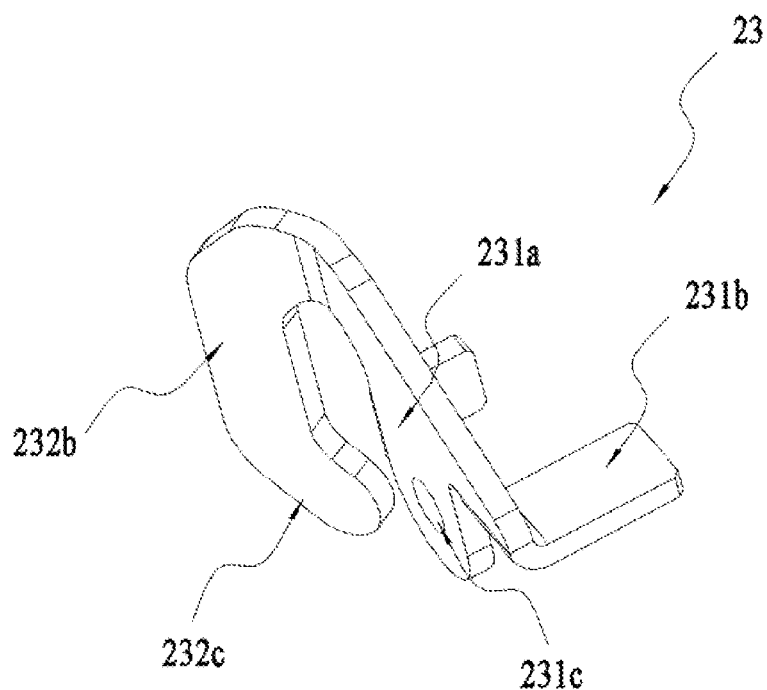
FIG. 17 is a perspective view of the hook of FIG. 14.
Figure 18:
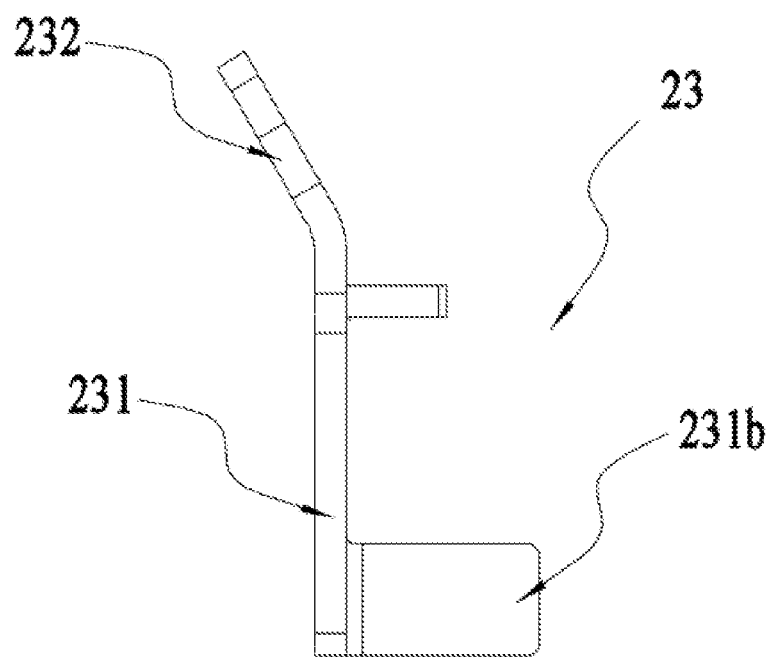
FIG. 18 is a top view of the hook of FIG. 14.

As illustrated in FIGS. 1 and 5, the blower 100 further includes a blow nozzle 22, which is detachably connected to the air tube 11, and the blow nozzle 22 is also assembled at an end of the air tube 11 where the air outlet is provided. As illustrated in FIG. 4, the blow nozzle 22 is provided with a blow channel 22a, the blow channel 22a is in communication with the air duct 111, and the blow channel 22a extends along the first straight line 101. When the fan 13 rotates, the blowing airflow flows through the air channel 111 and the blow channel 22a in order, and then blows toward the leaves and the like.

As illustrated in FIGS. 10 to 13, the blow nozzle 22 includes a fitting portion 221, a blow portion 222, and a connection portion 223. The fitting portion 221 is used for assembling the blow nozzle 22 to the air tube 11, and the blow portion 222 is formed with a blow port 222a for air outlet. An end of the connection portion 223 is connected to the fitting portion 221, and another end is smoothly connected to the blow portion 222. The connection portion 223 makes the flow velocity of the blowing airflow increase when passing through the connection portion 223, thereby improving the blowing effect.

Specifically, the fitting portion 221 is sleeved on the outer wall of the air tube 11, the outer wall of the fitting portion 221 is further provided with a button 221a, an inner side of the button 221a is provided with a locking groove 221b, the outer wall of the air tube 11 is provided with a convex portion 112 that may be inserted into the locking groove 221b, and the cooperation of the locking groove 221b and the convex portion 112 enables the blow nozzle 22 to be quickly fitted by the user. The fitting portion 221 may be a cylinder surrounding a first axis. An inner guide portion 221c is further formed on the inner wall of the fitting portion 221, and an outer guide portion 113 is formed on the outer wall of the air tube 11, and the fitting portion 221 is guided to be fitted to the air tube 11 along the first straight line 101 by the cooperation of the inner guide portion 221c and the outer guide portion 113. Specifically, the inner guide portion 221c is a groove arranged on the inner wall of the fitting portion 221, the groove extends in a direction parallel to the first straight line 101, the outer guide portion 113 is a protrusion arranged on the outer wall of the air tube 11, the protrusion also extends in a direction parallel to the first straight line 101. When the fitting portion 221 is coupled to the air tube 11, the protrusion slides in the groove along a direction parallel to the first straight line 101, thereby acting as a guide. In addition, through the cooperation of the groove and the protrusion, the rotation of the blow nozzle 22 relative to the air tube 11 may also be limited.

In addition, the ratio of a length L1 of the air tube 11 along the first straight line 101 to a length L2 of the fitting portion 221 along the first straight line 101 is greater than or equal to 7 and less than or equal to 11, and a ratio of a maximum circumferential length of the fitting portion 221 in a direction surrounding the first straight line 101 to a length of the fitting portion 221 along the first straight line 101 is greater than or equal to 3 and less than or equal to 4.5. Further, the length of the fitting portion 221 along the first straight line 101 is greater than or equal to 50 mm, which makes the length of the fitting portion 221 along the first straight line 101 long enough, thereby improving the stability of the blow nozzle 22 after being assembled to the air tube 11 and avoiding shaking of the blow nozzle 22, thereby improving the blowing effect and reducing noise.

The air blowing portion 222 is used for outputting air, and is a solid of revolution with the first straight line 101 as a rotation center. The inner wall of the blow portion 222 forms a cylindrical channel 222b around the first straight line 101, and the cylindrical channel 222b is a part of the blow channel 22a. By such arrangement, the blow port 222a is circle-shaped, so that a range of the blower 100 is relatively large, and the wind is more uniform.

The connection portion 223 is disposed between the fitting portion 221 and the blow portion 222, and the connection portion 223, the fitting portion 221, and the blow portion 222 are integrally formed. The connection portion 223 is also a solid of revolution with the first straight line 101 as a rotation center. The inner wall of the connection portion 223 is provided with a connection channel 223a around the first straight line 101, the connection channel 223a is a part of the blow channel 22a, and the both ends of the connection channel 223a may be respectively connected to the air duct 111 and the cylindrical channel 222b. The connection channel 223a is a solid of revolution structure using the first straight line 101 as a rotation center.

In the present example, the connection channel 223a gradually decreases along the first straight line 101 and a direction pointing from the fitting portion 221 toward the blow portion 222, that is, the connection channel 223a gradually decreases from back to front, so that the blowing airflow may be accelerated when flowing through the connection channel 223a.

The connection channel 223a is symmetrically disposed about the symmetric plane 102, and a cross section of the connection channel 223a in the symmetric plane 102 is a two-section symmetrical curve 223b. Both ends of the curve 223b are connected to the fitting portion 221 and the blow portion 222. An included angle between a tangent line at each point on the curve 223b and the first straight line 101 first becomes greater and then becomes less from an end of the curve 223b connecting to the connection portion 223 to an end connecting to the blow portion 222, so that the connection channel 223a presents a streamlined structure, which reduces noise, reduces energy loss, and improves the blowing effect.

A ratio of the length L1 of the air tube 11 along the first straight line 101 to a length L3 of the connection portion 223 along the first straight line 101 is greater than or equal to 6 and less than or equal to 13. Thus, the length of the connection portion 223 will not be too long, so that the blowing airflow will not attenuate energy due to an excessively long flow path, and the length of the connection portion 223 will not be too short, so that the blowing airflow will not attenuate energy due to the connection channel 223a not being smooth enough.

As illustrated in FIGS. 14 to 18, the blower 100 further includes a hook 23 for hanging the blower 100 to a belt, strap, etc. of the user, so that when the user operates the blower 100, a part of the weight of the blower 100 may be taken by the strap, thereby reducing the force on the hands of the user and reducing fatigue of the user.

The hook 23 specifically includes a fitting portion 231 and a hook body 232. The fitting portion 231 is used to enable the hook 23 to be fitted on the housing 15, and the hook body 232 is used to contact the strap to implement hanging the blower 100. The hook body 232 is curved along a curve to form an opening 232a, which is arranged open, and the user may couple the strap to the hook 23 via the opening 232a. In the present disclosure, a distance between the hook 23 and a center of gravity G of the blower 100 including the battery pack 14 is greater than or equal to 50 mm and less than or equal to 80 mm, so that the user may operate the blower 100 relatively steadily.

Specifically, the hook 23 is also disposed at the joining portion 153 of the housing 15 and is disposed adjacent to the battery pack 14. And along the first straight line 101, the hook 23 is disposed on a side of the air inlet facing toward the battery pack 14. Furthermore, along the first straight line 101, the hook 23 is further disposed on a side of the air inlet hood 16 facing toward the battery pack 14. By such arrangement, the position of the hook 23 is reasonable, and when the suspending the blower 100 on the strap, the user may conveniently hold the handle 151 and may operate the blower 100 very steadily.

The fitting portion 231 includes a fitting surface 231a extending in a plane parallel to the first straight line 101, and the plane is also parallel to the symmetric plane 102. When the hook 23 is assembled to the housing 15 through the fitting portion 231, the fitting surface 231a will be adhered to the surface of the housing 15, thereby preventing the hook 23 from shaking and loosening. The surface of the housing 15 is also recessed to form an insertion slot 15c, and the fitting surface 231a is formed with an insertion portion 231b facing toward the housing 15. The number of the insertion slots 15c is two, the number of the insertion portions 231b is also two, and the two insertion portions 231b are respectively inserted into the corresponding insertion slots 15c. The fitting surface 231a is further provided with a through hole 231c penetrating the fitting surface 231a in a direction perpendicular to the symmetric plane 102, and then embedded into the housing 15 through the through hole 231c via a fastener, so that the hook 23 is fixed to the housing 15. The fastener may specifically be a screw. Two insertion portions 231b are further provided on both sides of the through hole 231c.

The hook body 232 is integrally formed with the fitting portion 231, the hook body 232 extends from the fitting portion 231 in a direction away from the fitting portion 231, the hook body 232 also extends in a plane that obliquely intersects the symmetric plane 102, and an included angle formed between the plane and the first straight line 101 is greater than or equal to 10 degrees and less than or equal to 50 degrees. By such arrangement, it is possible to prevent the strap from being easily detached from the hook 23 due to an excessively large included angle, and to prevent the strap from being difficult to be coupled to the hook 23 due to an excessively small included angle.

The hook body further includes a first section 232b and a second section 232c, the first section 232b extends in a direction perpendicular to the first straight line 101, and the second section 232c extends from the first section 232b, where the extending direction of the second section 232c obliquely intersects with that of the first section 232b. A side of the fitting surface 231a facing toward the first section 232b is also parallel to the first section 232b. The second section 232c extends from the first section 232b toward the fitting surface 231a and does not contact the fitting surface 231a, so that the above-mentioned opening 232a is formed between an end of the second section 232c and the fitting surface 231a, and the opening 232 a is also opened toward the battery pack 14.

In the present disclosure, the number of the hook 23 is one. It can be understood that, in other examples, the number of the hooks 23 may also be two, and the two hooks 23 may be respectively disposed on both sides of the symmetric plane 102. Specifically, the two hooks 23 are respectively disposed on the left housing 156 and the right housing 157, so as to adapt to operating habits of the user.

The foregoing illustrates and describes the basic principles, main features and advantages of the present disclosure. It is to be understood by those skilled in the art that the above examples do not limit the present disclosure in any means, and solutions obtained by means of equivalent substitution or equivalent transformation shall all fall in the scope of protection of the present disclosure.

What is claimed is:

1. A handheld blower, comprising:
an air tube, provided with an air duct extending along a first straight line;
an electric motor, arranged in the air duct;
a fan, configured to be driven by the electric motor;
a housing, provided with a handle configured to be held by a user and a joining portion configured for connecting to a power source;
a circuit board, electrically connected to the electric motor;
a main switch, comprising a main operation unit for the user to operate and a main switch element electrically connected to the circuit board, wherein the main switch element controls the electric motor to start when the main operation unit is operated by the user; and
a first speed adjusting switch, comprising a first operation unit for the user to operate and a first switch element electrically connected to the circuit board, wherein the first switch element controls the motor to run at different speeds when the first operation unit is operated by the user,
wherein the main operation unit is disposed on a bottom side of the handle, and the first operation unit is disposed on a left side of the handle, and
wherein the main operating unit and the housing form a rotatable connection with a second straight line as an axis, the first operating unit and the housing form a rotatable connection with a third straight line as an axis, wherein the third straight line and the second straight line are substantially parallel to each other.

2. The blower according to claim 1, wherein the air tube is provided with an air inlet at an end of the air duct and an air outlet at another end of the air duct, and the first operation unit is disposed between the joining portion and the air inlet in a direction along the first straight line.

3. The blower according to claim 1, wherein when a hand of the user holds the handle, the hand is operative to simultaneously hold the main operation unit, and the hand is operative to simultaneously touch the first operation unit.

4. A handheld blower, comprising:
an air tube, provided with an air duct extending along a first straight line;
an electric motor, arranged in the air duct;
a fan, configured to be driven by the electric motor;
a housing, provided with a handle configured to be held by a user with a hand, and a joining portion configured for connecting to a power source, wherein at least a portion of the handle is disposed at a rear side of the air tube;
a circuit board, electrically connected to the electric motor;
a main switch, comprising a main operation unit for the user to operate and a main switch element electrically connected to the circuit board, wherein the main switch element controls the electric motor to start when the main operation unit is operated by the user;
a first speed adjusting switch, comprising a first operation unit for the user to operate and a first switch element electrically connected to the circuit board, wherein the first switch element controls the motor to run at different speeds when the first operation unit is operated by the user, the first speed adjusting switch is disposed adjacent to the handle so that when the user holds the handle, the hand of the user may contact the first speed adjusting switch without releasing the handle thereby facilitating the user to adjust a rotational speed of the motor; and
a second speed adjusting switch, comprising a second operation unit for the user to operate and a second switch element electrically connected to the circuit board, wherein the second switch element controls the motor to run at a maximum rotational speed when the second operation unit is operated by the user;
wherein the main operation unit is disposed on a bottom side of the handle, the first operation unit is disposed on a left side of the handle, and the second operation unit is disposed on a top side of the handle.

5. A handheld blower, comprising:
an air tube, provided with an air duct extending along a first straight line;
an electric motor, arranged in the air duct;
a fan, configured to be driven by the electric motor;
a housing, provided with a handle configured to be held by a user and a joining portion configured for connecting to a power source;
a circuit board, electrically connected to the electric motor;
a main switch, comprising a main operation unit for the user to operate and a main switch element electrically connected to the circuit board, wherein the main switch element controls the electric motor to start when the main operation unit is operated by the user;
a first speed adjusting switch, comprising a first operation unit for the user to operate and a first switch element electrically connected to the circuit board, wherein the first switch element controls the motor to run at different speeds when the first operation unit is operated by the user; and
a second speed adjusting switch, comprising a second operation unit for the user to operate and a second switch element electrically connected to the circuit board, wherein the second switch element controls the motor to run at a maximum rotational speed when the second operation unit is operated by the user,
wherein the main operation unit is disposed on a bottom side of the handle, the first operation unit is disposed on a left side of the handle, and the second operation unit is disposed on a top side of the handle, and
wherein the main operating unit and the housing form a rotatable connection with a second straight line as an axis, the first operating unit and the housing form a rotatable connection with a third straight line as an axis, wherein the third straight line and the second straight line are substantially parallel to each other.

6. The blower according to claim 5, wherein the air tube is provided with an air inlet at an end of the air duct and an air outlet at another end of the air duct, and the first operation unit is disposed between the joining portion and the air inlet in a direction along the first straight line.

7. The blower according to claim 6, wherein the second operation unit is disposed between the joining portion and the air inlet in a direction along the first straight line.

8. The blower according to claim 6, wherein a separating board is provided in the housing and configured to separate the circuit board from the first switch element.

9. The blower according to claim 8, further comprising a heat dissipation element connected to the circuit board, wherein a heat dissipation airflow is operative to flow through the heat dissipation element, and the heat dissipation element is disposed on a side of the separating board where the circuit board is arranged.

10. The blower according to claim 9, wherein the housing comprises a left housing and a right housing that form an integrity when interconnected, wherein the left housing is provided with a left separating board portion, the right housing is provided with a right separating board portion; and, when the left housing and the right housing are interconnected, the left separating board portion and the right separating board portion are combined to form the separating board.

11. The blower according to claim 5, wherein when a hand of the user holds the handle, the hand is operative to simultaneously hold the main operation unit, and the hand is operative to simultaneously touch the first operation unit.

12. The blower according to claim 5, wherein the first operation unit is a rotary knob.

13. The blower according to claim 5, wherein the housing comprises a left housing and a right housing that form an integrity when interconnected, and the first operating unit is installed on the left housing.

14. The blower according to claim 5, wherein a distance between a point closest to the main operation unit on the first operation unit and a point closest to the first operation unit on the main operation unit is less than or equal to 5 cm, so that a user's hand holding the main operating unit is able to simultaneously operate the first operating unit.

15. The blower according to claim 5, further comprising a control circuit, configured to control the electric motor to start in response to the first operating unit being triggered by the user when the main operation unit is not triggered by the user.

16. The blower according to claim 5, wherein the housing is further provided with an airflow inlet and an airflow outlet; when the fan rotates, a heat dissipation airflow flowing from the airflow inlet into the housing and flowing out of the housing from the airflow outlet is operative to be generated in the housing; and the first switch element is disposed outside of a flow path of the heat dissipation airflow in the housing.

17. The blower according to claim 16, wherein a separating board is provided in the housing, the flow path of the heat dissipation airflow in the housing is disposed on one side of the separating board, and the first switch element is disposed on another side of the separating board.

18. The blower according to claim 17, wherein the main operating unit comprises an actuation portion configured for contacting the main switch element wherein a user's hand, when gripping the handle, is operative to simultaneously hold the main operating unit, and the actuation portion is disposed outside of the flow path of the heat dissipation airflow in the housing.

19. The blower according to claim 18, wherein the second operating unit comprises a second actuation portion arranged in the housing and configured for contacting the second switch element, wherein the second actuation portion and the second switch element are disposed outside of the flow path of the heat dissipation airflow in the housing.

20. The blower according to claim 5, wherein the housing is arranged symmetrically about a plane, and the first operating unit is disposed on a left side of the plane.

* * * * *